(12) United States Patent
Chen et al.

(10) Patent No.: US 11,647,280 B2
(45) Date of Patent: May 9, 2023

(54) APPARATUS AND METHOD FOR LOWERING POWER DISSIPATION BASED ON OPERATION BETWEEN DUAL PROCESSORS

(71) Applicant: Sigmastar Technology Ltd., Xia'men (CN)

(72) Inventors: Fu-Cheng Chen, Hsinchu County (TW); Chao-Kai Chang, Hsinchu County (TW); Yao-Chang Hsieh, Hsinchu County (TW)

(73) Assignee: SIGMASTAR TECHNOLOGY LTD., Xia'men (CN)

( * ) Notice: Subject to any disclaimer, the term of this patent is extended or adjusted under 35 U.S.C. 154(b) by 0 days.

(21) Appl. No.: 17/563,099

(22) Filed: Dec. 28, 2021

(65) Prior Publication Data

US 2023/0025324 A1 Jan. 26, 2023

(30) Foreign Application Priority Data

Jul. 21, 2021 (CN) .......................... 202110824844.8

(51) Int. Cl.
*H04N 23/60* (2023.01)
*G06T 1/00* (2006.01)
*G06T 7/20* (2017.01)
*H04N 23/80* (2023.01)

(52) U.S. Cl.
CPC ........... *H04N 23/64* (2023.01); *G06T 1/0007* (2013.01); *G06T 7/20* (2013.01); *H04N 23/80* (2023.01)

(58) Field of Classification Search
CPC ........... H04N 5/23222; H04N 5/23229; H04N 23/64; H04N 23/80; G06T 1/0007; G06T 7/20
See application file for complete search history.

(56) References Cited

U.S. PATENT DOCUMENTS

| | | | |
|---|---|---|---|
| 8,085,309 B1 * | 12/2011 | Kelliher | H04N 5/2252 348/143 |
| 10,674,061 B1 * | 6/2020 | Neglur | H04N 5/23245 |
| 2016/0189716 A1 * | 6/2016 | Lindahl | G10L 17/24 704/251 |

FOREIGN PATENT DOCUMENTS

EP 3567938 A1 * 11/2019 ............. G06F 1/163

* cited by examiner

*Primary Examiner* — Ahmed A Berhan
(74) *Attorney, Agent, or Firm* — WPAT, P.C (57) ABSTRACT

The present disclosure discloses a dual-processor electronic apparatus operation method used in a dual-processor electronic apparatus that includes steps outlined below. A first processor is activated in an initialization procedure. A second processor is activated by the first processor to enter an operation mode. The first processor is deactivated in the operation mode, and the second processor executes a predetermined procedure. Whether a predetermined event occurs during the execution of the predetermined procedure is determined by the second processor such that event information is stored when the predetermined event occurs and the first processor is activated. The event information is accessed and processed by the first processor.

20 Claims, 4 Drawing Sheets

APPARATUS AND METHOD FOR LOWERING POWER DISSIPATION BASED ON OPERATION BETWEEN DUAL PROCESSORS

This application claims the benefit of China application Serial No. CN202110824844.8, filed Jul. 21, 2021, the subject matter of which is incorporated herein by reference.

BACKGROUND OF THE INVENTION

1. Field of the Invention

The present disclosure relates to a dual-processor electronic apparatus and an operation method thereof.

2. Description of Related Art

Electronic apparatus can be powered by a stable power source or a battery. For the electronic apparatus powered by the battery, the power consumption of the battery is fast when the power dissipation of the operation of the electronic apparatus is larger such that the electronic apparatus can not operate for a longer time when the battery is dead. As a result, effectively reducing the power dissipation of the electronic apparatus becomes an important issue.

SUMMARY OF THE INVENTION

In consideration of the problem of the prior art, an object of the present disclosure is to provide a dual-processor electronic apparatus and an operation method thereof.

The present disclosure discloses a dual-processor electronic apparatus operation method used in a dual-processor electronic apparatus that includes the steps outlined below. A first processor is activated in an initialization procedure. A second processor is activated by the first processor to enter an operation mode. The first processor is deactivated, and the second processor executes a predetermined procedure in the operation mode. Whether a predetermined event occurs during the execution of the predetermined procedure is determined by the second processor, event information is stored when the predetermined event occurs and the first processor is activated by the second processor. The event information is accessed by the first processor to perform processing accordingly.

The present disclosure also discloses a dual-processor electronic apparatus that includes a first processor and a second processor. The first processor is configured to be activated in an initialization procedure. After the first processor is activated in the initialization procedure, a second processor is activated by the first processor to enter an operation mode. The first processor is deactivated after the second processor enters the operation mode, and the second processor executes a predetermined procedure. The second processor determines whether a predetermined event occurs during the execution of the predetermined procedure, and stores event information when the predetermined event occurs and activates the first processor such that the first processor accesses the event information to perform processing accordingly.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a dual-processor electronic apparatus and an operation method thereof to keep the second processor having a relatively lower power dissipation to operate for longer time period and activate the first processor having a relatively higher power dissipation to perform processing only when a predetermined event occurs, such that the power dissipation of the dual-processor electronic apparatus can be as low as possible.

Figure 1:
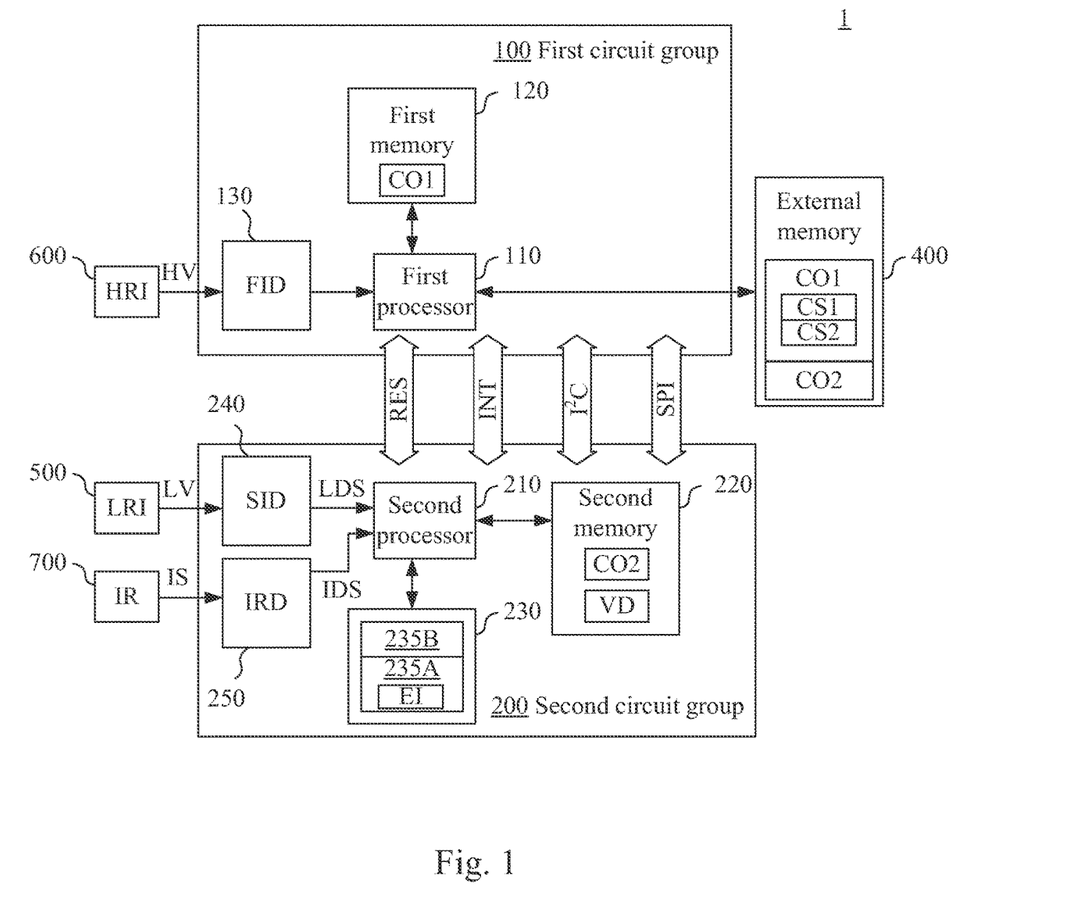
FIG. 1 illustrates a schematic diagram of a dual-processor electronic apparatus according to an embodiment of the present invention.

Reference is now made to FIG. 1. FIG. 1 illustrates a schematic diagram of a dual-processor electronic apparatus 1 according to an embodiment of the present invention. In an embodiment, the dual-processor electronic apparatus 1 is a surveillance system having two processors that operate in an interlaced manner. The dual-processor electronic apparatus 1 includes a first processor 110, a first memory 120, a first image detection control circuit 130 (abbreviated as FID in FIG. 1), a second processor 210, a second memory 220, a register circuit 230, a second image detection control circuit 240 (abbreviated as SID in FIG. 1), an infrared detection control circuit 250 (abbreviated as IRD in FIG. 1), an external memory 400, a low resolution image sensor 500 (abbreviated as LRI in FIG. 1), a high resolution image sensor 600 (abbreviated as HRI in FIG. 1) and an infrared sensor 700 (IR in FIG. 1).

As illustrated in FIG. 1, the first processor 110 is disposed in a first circuit group 100 and is configured to control the first circuit group 100. The second processor 210 is disposed in a second circuit group 200 and is configured to control the second circuit group 200. The signal transmission between the first circuit group 100 and the second circuit group 200 can be performed through a serial peripheral interface (SPI), an inter-integrated circuit transmission interface (I²C), the interrupt signal transmission interface (INT), and a reset signal transmission interface (RES).

In an embodiment, the interrupt signal transmission interface is a single direction transmission interface that allows the second circuit group 200 to transmit an interrupt signal to the first circuit group 100. The reset signal transmission interface is also a single direction transmission interface that allows the first circuit group 100 to transmit a reset signal to the second circuit group 200.

In an embodiment, the first circuit group 100 and the second circuit group 200 can be selectively disposed in the same chip or disposed in different chips which include a first chip and a second chip (not illustrated in the figure).

In an embodiment, the first processor 110 is configured to perform high-level data processing and have relatively larger power dissipation. The second processor 210 is configured to perform low-level data processing and have relatively smaller power dissipation.

In an embodiment, the dual-processor electronic apparatus 1 can be an electronic apparatus powered by a battery. In order to lower the power dissipation, the present invention provides a dual-processor electronic apparatus operation method to allow the first processor 110 and the second processor 210 to operate in an interlaced manner to keep the power dissipation as low as possible.

More specifically, the first processor 110 is configured to be activated in an initialization procedure. Subsequently, the first processor 110 is configured to activate the second processor 210 in the initialization procedure to enter an operation mode. The first processor 110 is deactivated, and the second processor 210 executes a predetermined procedure.

Whether a predetermined event occurs during the execution of the predetermined procedure is determined by the second processor. Event information is stored when the predetermined event occurs and the first processor 110 is activated by the second processor 210. The event information is accessed by the first processor 110 to perform processing accordingly.

The process that the dual-processor electronic apparatus 1 enters the operation mode from the initialization procedure is further described in the following paragraphs.

In an embodiment, the external memory 400 is disposed outside of the first circuit group 100 and the second circuit group 200 and is a non-volatile memory, e.g., a flash memory, in which the external memory 400 does not lose the data stored therein after the power turns off. The external memory 400 is configured to store a first code CO1 corresponding to the first processor 110 and store a second code CO2 corresponding to the second processor 210. In an embodiment, the first processor 110 is electrically coupled to the external memory 400 and is able to access the external memory 400. The second processor 210 is not electrically coupled to the external memory 400 and is not able to access the external memory 400.

The first memory 120, corresponding to the first processor 110, is disposed in the first circuit group 100. The second memory 220, corresponding to the second processor 210, is disposed in the second circuit group 200. In an embodiment, the first memory 120 and the second memory 220 are volatile memory, including but not limited to, e.g., a dynamic random access memory (DRAM) or a static random access memory (SRAM), in which the first memory 120 and the second memory 220 lose the data stored therein after the power turns off.

In the initialization procedure, the system provides power to the first processor 110 and the peripheral components related to the first processor 110, such as but not limited to the external memory 400 and the first memory 120 described above. The first code CO1 corresponding to the first processor 110 is loaded from the external memory 400 to the first memory 120 such that the first processor 110 retrieves the first code CO1 from the first memory 120 and operates accordingly.

In an embodiment, the first code CO1 that the first processor 110 executes may include a first partial code CS1 and a second partial code CS2. In the initialization procedure, the first processor 110 executes the first partial code CS1 first and activates the second processor 210 before the second partial code CS2 is executed.

In an embodiment, the first partial code CS1 at least include a kernel of an operation system and commands to determine whether the second processor 210 is to be activated. The first processor 110 may determine whether the second processor 210 is to be activated according to the execution condition of the first partial code CS1. For example, in an embodiment, the first processor 110 starts to activate the second processor 210 after the first processor 110 determines that the kernel in the first partial code CS1 is executed, in which not all the activation procedure of the operation system needs to be fully executed. In another embodiment, the first processor 110 may selectively activate the second processor 210 after all the activation procedure of the operation system in the first code CO1 is executed.

The first partial code CS1 may also include commands to determine whether the second partial code CS2 is to be executed. In an embodiment, such commands are configured to execute the second partial code CS2 after determining that the first processor 110 had received an interrupt signal from the second processor 210 and a predetermined event had occurred. The detailed content of the predetermined event and the second partial code CS2 is described later.

Further, the first partial code CS1 may include commands to load the second code CO2 corresponding to the second processor 210 into the second memory 220, and include setting values related to the second processor 210.

More specifically, the first processor 110 is configured to load the second code CO2 corresponding to the second processor 210 from the external memory 400 to the second memory 220 according to the commands included in the first partial code CS1. The second processor 210 further retrieves the second code CO2 from the second memory 220 and operates accordingly.

In an embodiment, the first processor 110 may load the second code CO2 from the external memory 400 to the second memory 220 through the serial peripheral interface SPI. Further, in an embodiment, the first processor 110 may read the second code CO2 from the second memory 220 to perform such as, but not limited to a verification of cyclic redundancy check (CRC). If the verification result shows that an error occurs, the first processor 110 may reload the second code CO2 from the external memory 400 to the second memory 220.

Further, the first processor 110 sets at least one setting parameter(s) in the register circuit 230 according to the data included in the first partial code CS1. The second processor 210 executes the predetermined procedure according to the setting parameters.

In an embodiment, the register circuit 230 is correspondingly disposed in the second circuit group 200 and may include a first register 235A and a second register 235B. The first processor 110 and the second processor 210 both are capable of accessing the first register 235A. The second processor 210 is capable of accessing the second register 235B and the first processor 110 is not capable of accessing the second register 235B. As a result, the first processor 110 may access the first register 235A in the register circuit 230 through such as, but not limited to the inter-integrated circuit transmission interface I$^2$C to store different setting parameters in the first register 235A such that the second processor 210 can access the setting parameters.

In an embodiment, the setting parameters may include the setting values that the second processor 210 uses to configure the second memory 220. The second processor 210 accesses the second memory 220 according to the accessing configuration according to the definition made by the setting parameters.

In an embodiment, the setting parameters may include the number and the operation parameters of the peripheral components of the second processor 210 such that the second processor 210 controls the peripheral components according to the definition of the setting parameters. In an embodiment, the peripheral components may include such as, but not limited to a low resolution image sensor 500 and an infrared sensor 700 that are corresponding to the second processor 210 but are disposed outside of the second circuit group 200.

It is appreciated that according to the definition of the setting parameters, the second processor 210 may control the low resolution image sensor 500 through the second image detection control circuit 240 to perform image detection, image retrieving and image processing. Further, the second processor 210 may control the infrared sensor 700 through the infrared detection control circuit 250 to perform infrared detection.

For example, the low resolution image sensor 500 is configured to perform image retrieving and generate a low-level image LV. The second image detection control circuit 240 may include circuits used to perform image processing and motion detection on the low-level image LV, to generate an image detection signal LDS when an object motion is detected. The first processor 110 may write the setting values of the setting parameters of the motion detection circuit into the register circuit 230 (e.g., the register 235A), in which the setting parameters may include the operation modes and parameters related to the image detection, retrieving and processing. For example, the operations modes of the motion detection may include a day mode and a night mode, and the parameters may correspondingly include related determining parameters of image detection and processing.

On the other hand, the infrared sensor 700 is configured to detect the infrared energy to generate an infrared signal IS. The infrared detection control circuit 250 determines the infrared variation amount according to the infrared signal IS. The first processor 110 may write the setting values of the setting parameters of the infrared detection control circuit 250 into the register circuit 230 (e.g., the register 235A), in which the setting parameters may include the threshold values related to the infrared variation amount. The infrared detection control circuit 250 generates an infrared detection signal IDS when the infrared variation amount is larger than a threshold value.

In an embodiment, the setting parameters may include the setting values of each of the time counter (not illustrated in the figure) in the second circuit group 200 such that the second processor 210 operates according to the time and period defined by the setting parameters.

The first partial code CS1 may also include commands to deactivate the first processor 110 such that the first processor 110 is deactivated and enters a power-off status after the initialization procedure is finished and the second processor 210 is activated. The second processor 210 starts to execute the predetermined procedure. In an embodiment, the second processor 210 is not required to be always in the operation status during the execution of the predetermined procedure and is able to switch between the operation status and the sleep status periodically according to the time counter set by the first processor 110. The power dissipation can be further reduced.

The operation of the dual-processor electronic apparatus 1 in the operation mode is further described in the following paragraphs.

The second processor 210 determines whether a predetermined event occurs during the execution of the predetermined procedure. The second processor 210 stores event information EI when the predetermined event occurs and activates the first processor 110. The first processor 110 further accesses the event information EI to perform processing accordingly.

In an embodiment, when the predetermined event occurs, the second processor 210 delivers the interrupt signal through the interrupt signal transmission interface INT to activate the first processor 110, and stores the cause of the delivering of the interrupt signal in the form of the event information EI. In an embodiment, the event information EI is stored in the register circuit 230, e.g., the register 235A that the first processor 110 is capable of accessing. After being activated, the first processor 110 accesses the event information EI to determine the status of the second processor 210 and further determines the subsequent operation.

The predetermined event can be an object motion event or an operation error event. The first processor 110 determines whether the predetermined event is the object motion event or the operation error event according to the event information EI and performs different processing based on different types of the predetermined event.

Figure 2:
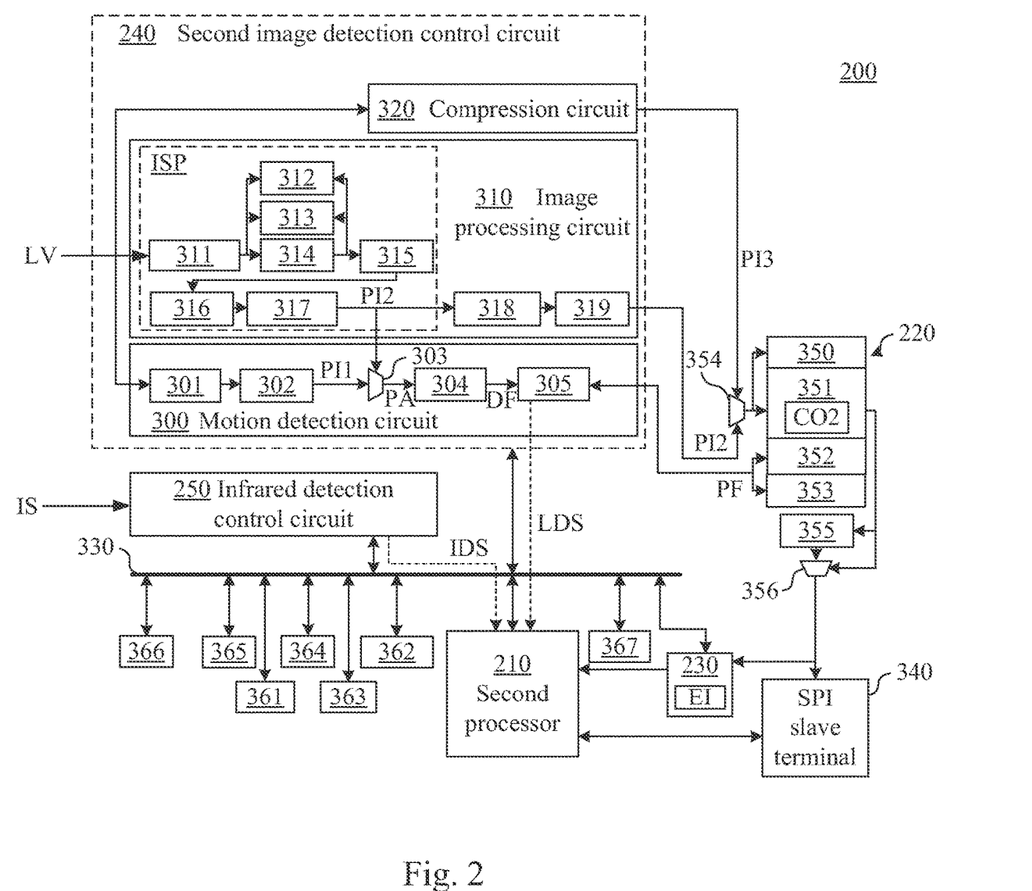
FIG. 2 illustrates a detail circuit block diagram of the second circuit group according to an embodiment of the present invention.

Reference is now made to FIG. 2. FIG. 2 illustrates a detailed circuit block diagram of the second circuit group 200 according to an embodiment of the present invention.

FIG. 2 shows the second processor 210, the second memory 220, the register circuit 230, the second image detection control circuit 240 and the infrared detection control circuit 250 included in the second circuit group 200 in FIG. 1. However, in FIG. 2, not only a motion detection circuit 300, an image processing circuit 310 and a compression circuit 320 included in the second image detection control circuit 240 are illustrated, but also a bus 330, a plurality of components coupled to the bus 300 and a serial peripheral interface slave terminal 340 (abbreviated as SPI slave terminal in FIG. 2) are illustrated.

The bus 330 allows the component coupled thereto to communicate with each other, in which the components coupled to the bus 330 are described in detail later. The serial peripheral interface slave terminal 340 is coupled to a serial peripheral interface master terminal (not illustrated in the figure) in the first circuit group 100 through the serial peripheral interface SPI in FIG. 1, to provide a transmission path for a larger amount of information between the first circuit group 100 and the second circuit group 200. For example, the first processor 110 may load the second code CO2 to the second memory 220 through the serial peripheral interface master terminal, the serial peripheral interface SPI and the serial peripheral interface slave terminal 340.

When the second image detection control circuit 240 determines that an object motion is detected in the low-level image LV retrieved by the low resolution image sensor 500 and generates the image detection signal LDS, the second processor 210 determines that the predetermined event occurs, in which the predetermined event is the object motion event.

More specifically, the second image detection control circuit 240 may perform motion detection on the low-level image LV retrieved by the low resolution image sensor 500 in FIG. 1 by using the motion detection circuit 300 included therein.

In an embodiment, the motion detection circuit 300 may include an optical brightness correction (OBC) and automatic exposure gain (AEG) circuit 301, a Bayer gamma correction circuit 320, a multiplexer 303, an H-median operation circuit 304 and a motion detection sub-circuit 305.

The OBC and AEG circuit 301 and the Bayer gamma correction circuit 320 respectively perform pre-processing of optical brightness correction, automatic exposure gain and Bayer gamma correction on the low-level image LV first to generate a processed image PH.

The multiplexer 303 selects either the processed image PH or a processed image PI2 generated by the image processing circuit 310 to be an image PA such that the detection is actually performed according to the image PA. The processing performed by the image processing circuit 310 is described later. The H-median operation circuit 304 performs H-median operation on the image PA to generate an under-detect image DF. The motion detection sub-circuit 305 performs actual motion detection on the under-detect image DF and generates the image detection signal LDS when an object motion is detected. In an embodiment, when the motion detection sub-circuit 305 performs detection, a plurality of temporary images PF needs to be accessed such that the motion detection sub-circuit 305 compares previous and latter images and performs operation thereon.

In an embodiment, the bus 330 is coupled to the motion detection circuit 300, an inter-integrated circuit slave terminal 361 and a register circuit 230. The inter-integrated circuit slave terminal 361 is electrically coupled to the inter-integrated circuit transmission interface I²C in FIG. 1.

As a result, the first processor 110 can write the setting parameters related to the motion detection to the register circuit 230 through a path including an inter-integrated circuit master terminal (not illustrated), the inter-integrated circuit transmission interface I²C and the inter-integrated circuit slave terminal 361. The motion detection sub-circuit 305 accesses the setting parameters in the register circuit 230 to set related predetermined criteria according to a combination of a size, a motion range, a distance and other parameters of the detected object. The motion detection sub-circuit 305 generates the image detection signal LDS when the detection result matches the predetermined criteria.

In an embodiment, the second processor 210 receives the image detection signal LDS from the motion detection sub-circuit 305 through the bus 330. After receiving the image detection signal LDS, when the second processor 210 determines that the object motion event occurs, it stores the event information EI in the register circuit 230 through the bus 330. The second processor 210 may further use the image processing circuit 310 or the compression circuit 320 to process the low-level image LV and store the processed low-level image LV as the recorded image VD.

In an embodiment, the image processing circuit 310 includes a defect pixel correction (DPC) circuit 311, an auto exposure (AE) circuit 312, an auto white balance (AWB) circuit 313, a optical brightness correction and white balance gain circuit 314, a de-mosaic circuit 315, a color correction matrix (CCM) and gamma circuit 316, a RGB-to-YUV conversion circuit 317, a storage circuit 318 and a JPEG encoding circuit 319.

In an embodiment, the DPC circuit 311, the AE circuit 312, the AWB circuit 313, the optical brightness correction and white balance gain circuit 314, the de-mosaic circuit 315, the CCM and gamma circuit 316 and the RGB-to-YUV conversion circuit 317 can be integrated as an image signal processor unit ISP. These circuits in the image signal processor unit ISP perform the processing of defect pixel correction, auto exposure, auto white balance, optical brightness correction, white balance gain, de-mosaic, color correction matrix and gamma processing and RGB-to-YUV conversion on the low-level image LV to generate the processed image PI2. The processed image PI2 can be stored in the storage circuit 318 related to the JPEG encoding circuit 319. The JPEG encoding circuit 319 further performs encoding on the stored processed image PI2 and outputs the encoded result.

On the other hand, the low-level image LV may also selectively be compressed by compression circuit 320 by using an 8-bit to 6-bit compression process without any other processing, such that the compression circuit 320 generates the processed image PI3.

The second memory 220 includes a first memory power controlled block 350, an image storage block 351, a motion image storage block 352 and a second memory power controlled block 353.

In an embodiment, the first memory power controlled block 350 and the image storage block 351 receive the processed image PI2 generated by the image processing circuit 310 or the processed image PI3 generated by the compression circuit 320 through a multiplexer 354 to perform power control and store the processed image PI2 or the processed image PI3 as the recorded image VD. In an embodiment, the recorded image VD can be stored in the image storage block 351 of the second memory 220 in an original format or a compressed format.

The motion image storage block 352 and the second memory power controlled block 353 receive the temporary images PF that the motion detection sub-circuit 305 requires, to perform power control and store the temporary images PF. The temporary images PF can thus be retrieved by the motion detection sub-circuit 305.

The bus 330 may also be coupled to the interrupt signal control circuit 362 that is coupled to the interrupt signal transmission interface INT. When the second processor 210 receives the image detection signal LDS and determines that the object motion event occurs, the second processor 210 may control the interrupt signal control circuit 362 through the bus 330 such that the interrupt signal control circuit 362 delivers the interrupt signal through the interrupt signal transmission interface INT to activate the first processor 110.

After the first processor 110 is activated, the first processor 110 may execute the first code CO1 first, and execute the second partial code CS2 subsequently after determining the object motion event occurs according to the event information EI. The second partial code CS2 includes the processing commands related to the event information EI.

In an embodiment, the second partial code CS2 includes the commands to access and process the recorded image VD. More specifically, the second partial code CS2 allows the first processor 110 to read the recorded image VD from the image storage block 351 of the second memory 220 through a path including the serial peripheral interface slave terminal 340, the serial peripheral interface SPI and the serial peripheral interface master terminal (not illustrated in the figure).

As illustrated in FIG. 2, in an embodiment, a decompression circuit 355 and a multiplexer 356 are included between the image storage block 351 and the serial peripheral interface slave terminal 340. The decompression circuit 355 performs a 6-bit to 8-bit decompression process on the recorded image VD stored in the image storage block 351. The multiplexer 356 is able to select the recorded image VD that is decompressed or not decompressed to be transmitted to the serial peripheral interface slave terminal 340 such that the first processor 110 reads the recorded image VD through the path described above.

In another embodiment, the second partial code CS2 includes commands to activate the high resolution image sensor 600 through the first image detection control circuit 130 to perform detection. The high resolution image sensor 600 includes light sensing elements having higher resolution than that of the low resolution image sensor 500, and is configured to perform image retrieving to generate a high-level image HV. The first image detection control circuit 130 may include components identical to the second image detection control circuit 240 to perform image processing, motion detection, image compression, image encoding. The detail is not described herein.

In an embodiment, after the first processor 110 is activated such that the event information EI and the recorded image VD are retrieved and/or the first image detection control circuit 130 and the high resolution image sensor 600 are activated, the first processor 110 may reset the register circuit 230 used to store the event information EI, clear the recorded image VD stored in the second memory 220 or reset the second processor 120.

On the other hand, the second processor 210 may receive information of different components and interrupt signal processing through the bus 330 during operation to provide communication with all the components coupled to the bus 330 when necessary. These components may include such as, but not limited to a time counter 363, a data bus 364 a universal synchronous asynchronous receiver transmitter (UART) circuit 365 and an inter-integrated circuit master terminal 366 used to perform communication with the low resolution image sensor 500 in FIG. 1. The second processor 210, by using the information of different components or the interrupt signal, may perform status monitoring on the components and set related predetermined criteria so as to determine the operation error event occurs when the predetermined criteria is matched.

For example, the predetermined criteria may include such as, but not limited to the conditions that the second processor 210 does not receive any image signal from the low resolution image sensor 500 within a predetermined time period, an error occurs during a periodic check performed for the second processor 210 or an error related to the first-in-first-out mechanism of the image storage occurs. Once the predetermined criteria is matched, the second processor 210 determines that the predetermined event occurs and the predetermined event is the operation error event.

As a result, after the first processor 110 is activated, the first processor 110 may determine that the operation error event occurs according to the event information EI and perform processing accordingly. In an embodiment, the processing performed by the first processor 110 may include delivering a reset signal through the reset signal transmission interface RES to a reset circuit 367 coupled to the bus 330 such that the second processor 210 receives the reset signal from the reset circuit 367 through the bus 330 and resets itself accordingly.

In an embodiment, after performing processing according to the event information EI, the first processor 110 is deactivated again. The second processor 210 keeps executing the predetermined procedure.

As a result, the dual-processor electronic apparatus of the present invention allows the first processor to execute the first partial code CS1 in the first code CO1 in the initialization procedure, activate the second processor and become deactivated. The second processor having lower power dissipation further executes the second code CO2 to execute the predetermined procedure. The second processor activates the first processor having higher power dissipation only when the predetermined event that requires a high-level data processing occurs, such that the first processor performs processing according to the second partial code CS2 in the first code CO1.

The method that operate the first processor and the second processor in an interlaced manner according to different parts of code can keep the power dissipation of the dual-processor electronic apparatus as low as possible to further accomplish the object of power-saving.

In the embodiments described above, the detection performed by the second image detection control circuit 240 is used to determine whether the object motion event occurs. However, the infrared detection control circuit 250 is also able to determine whether an infrared variation amount is larger than a threshold value according to the infrared signal IS generated by the infrared sensor 700 and generate the infrared detection signal IDS when the infrared variation amount is larger than the threshold value, such that the second processor 210 determines that the object motion event occurs to store the event information EI and the recorded image VD and deliver the interrupt signal through the interrupt signal transmission interface INT to activate the first processor 110 to perform subsequent processing.

It is appreciated that the dual-processor electronic apparatus that is implemented by a surveillance system described above is merely an example. In other embodiments, the dual-processor electronic apparatus may be an electronic apparatus used to process other types of data. Corresponding to the first processor and the second processor, the dual-processor electronic apparatus may include different peripheral components according to the types of data that is able to be processed. The present invention is not limited thereto.

Figure 3:
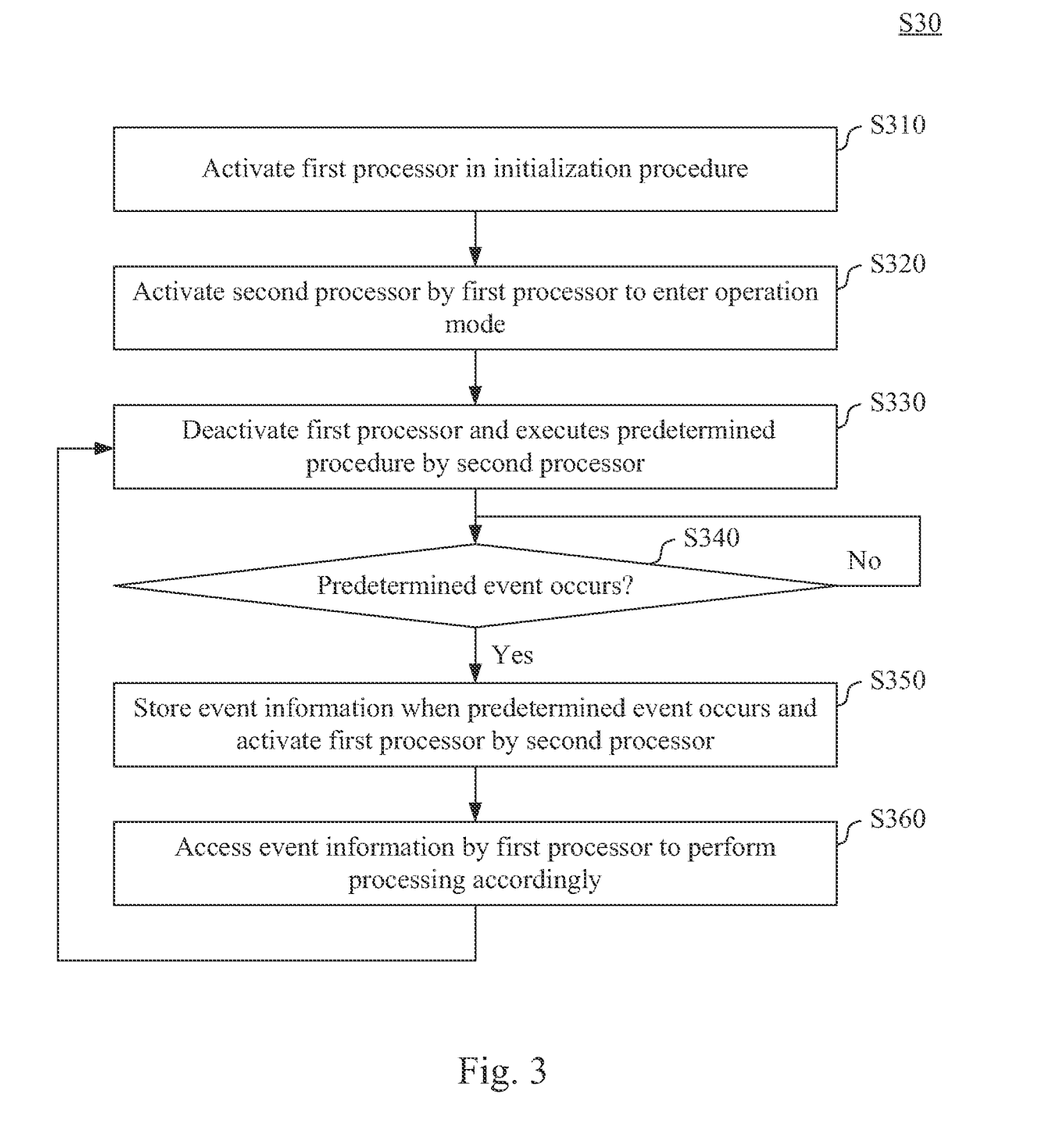
FIG. 3 illustrates a flow chart of a dual-processor electronic apparatus operation method

Reference is now made to FIG. 3. FIG. 3 illustrates a flow chart of a dual-processor electronic apparatus operation method S30 according to an embodiment of the present invention.

In addition to the apparatus described above, the present disclosure further provides the dual-processor electronic apparatus operation method S30 that can be used in such as, but not limited to, the dual-processor electronic apparatus 1 in FIG. 1. As illustrated in FIG. 3, an embodiment of the dual-processor electronic apparatus operation method S30 includes the following steps.

In step S310, the first processor 110 is activated in the initialization procedure.

In step S320, the second processor 210 is activated by the first processor 110 to enter the operation mode.

In step S330, the first processor 110 is deactivated, and the second processor 210 executes the predetermined procedure.

In step S340, whether the predetermined event occurs during the execution of the predetermined procedure is determined by the second processor 210. When the predetermined event does not occur, the flow goes back to step S340 to keep performing determination.

In step S350, the event information EI is stored when the predetermined event occurs and the first processor 110 is activated by the second processor 210.

In step S360, the event information EI is accessed by the first processor 110 to perform processing accordingly.

In an embodiment, after the first processor 110 finishes performing processing, the flow goes to step S330 such that the first processor 110 is deactivated again and the second processor 210 executes the predetermined procedure.

Figure 4:
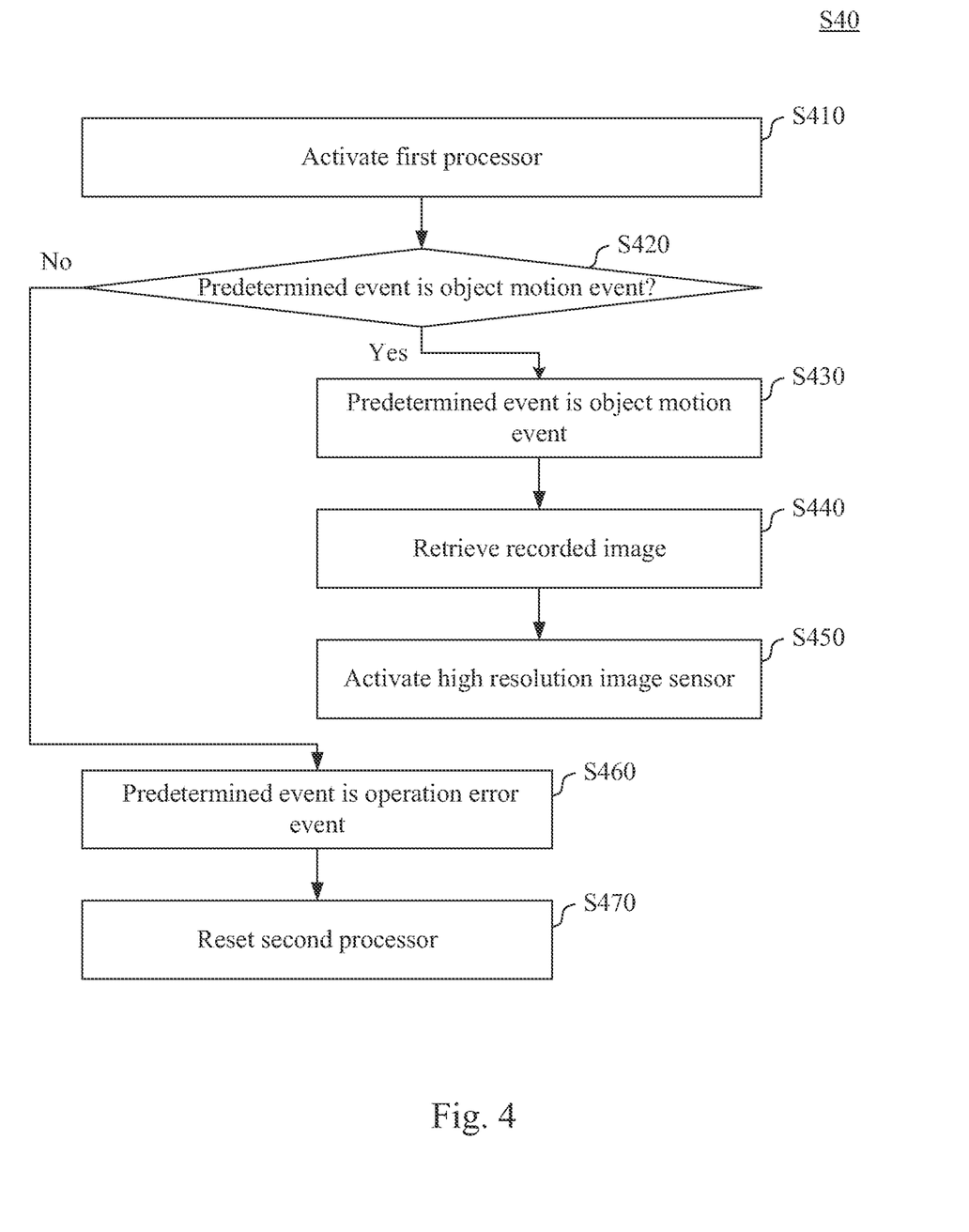
FIG. 4 illustrates a flow chart of a more detailed processing flow after the first processor accesses the event information in step S360 in FIG. 3 according to an embodiment of the present invention.

Reference is now made to FIG. 4. FIG. 4 illustrates a flow chart of a processing flow S40 after the first processor 110 accesses the event information EI in step S360 in FIG. 3 according to an embodiment of the present invention.

In step S410, the first processor 110 is activated.

In step S420, whether the predetermined event is the object motion event is determined by the first processor 110 according to the event information EI.

In step S430, the first processor 110 determines that the predetermined event is the object motion event according to the event information EI.

In step S440, the first processor 110 retrieves the recorded image VD.

In step S450, the first processor 110 activates the high resolution image sensor 600.

In step S460, the first processor 110 determines that the predetermined event is not the object motion event and is the operation error event according to the event information EI.

In step S470, the first processor 110 resets the second processor 210.

It is appreciated that the embodiments described above are merely an example. In other embodiments, it should be appreciated that many modifications and changes may be made by those of ordinary skill in the art without departing from the spirit of the invention.

In summary, the dual-processor electronic apparatus and the operation method thereof of the present invention keeps the second processor having a relatively lower power dissipation to operate for longer time and activates the first processor having a relatively higher power dissipation to perform processing only when a predetermined event occurs, such that the power dissipation of the dual-processor electronic apparatus can be as low as possible.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A dual-processor electronic apparatus operation method used in a dual-processor electronic apparatus, comprising:
   activating a first processor in an initialization procedure;
   activating a second processor by the first processor to enter an operation mode, wherein the first processor has a power dissipation larger than the second processor;
   deactivating the first processor, and executing a predetermined procedure by the second processor;
   determining whether a predetermined event occurs during the execution of the predetermined procedure, storing event information when the predetermined event occurs and activating the first processor by the second processor; and
   accessing the event information by the first processor to perform processing accordingly.

2. The dual-processor electronic apparatus operation method of claim 1, further comprising:
   deactivating the first processor after the first processor performs processing according to the event information, and executing the predetermined procedure by the second processor.

3. The dual-processor electronic apparatus operation method of claim 1, wherein the step of activating the first processor in the initialization procedure further comprises:
   loading a first code corresponding to the first processor from an external memory to a first memory such that the first processor operates according to the first code in the first memory;
   wherein the first code comprises a first partial code and a second partial code, the first partial code comprising commands to determine whether the second processor is to be activated and the second partial code comprising commands to activate an image detection control circuit; and
   wherein the first processor executes the first partial code and activates the second processor before the second partial code is executed.

4. The dual-processor electronic apparatus operation method of claim 3, wherein the second partial code comprises processing commands related to the event information.

5. The dual-processor electronic apparatus operation method of claim 1, wherein the first processor controls a first circuit group and the second processor controls a second circuit group, and the first processor is configured to set an operation setting of the second circuit group in a register circuit.

6. The dual-processor electronic apparatus operation method of claim 1, wherein the first processor controls a first circuit group and the second processor controls a second circuit group; and
   wherein the first circuit group comprises a first image detection control circuit configured to control a high resolution image sensor and the second circuit group comprises a second image detection control circuit configured to control a low resolution image sensor.

7. The dual-processor electronic apparatus operation method of claim 1, wherein the first processor controls a first circuit group and the second processor controls a second circuit group; and
   wherein the first processor and the first circuit group are disposed in a first chip and the second processor and the second circuit group are disposed in a second chip.

8. The dual-processor electronic apparatus operation method of claim 7, wherein the step of activating the second processor by the first processor to enter the operation mode comprises:
   loading a second code corresponding to the second processor from an external memory to a second memory of the second chip by the first processor through a serial peripheral interface.

9. The dual-processor electronic apparatus operation method of claim 7, wherein the second chip comprises a register circuit comprising a first register;
   wherein the first processor and the second processor both are capable of accessing the first register.

10. The dual-processor electronic apparatus operation method of claim 9, wherein the register circuit further comprises a second register;
    wherein the second processor is capable of accessing the second register and the first processor is not capable of accessing the second register.

11. The dual-processor electronic apparatus operation method of claim 9, wherein the first processor accesses the register circuit through an inter-integrated circuit transmission interface.

12. The dual-processor electronic apparatus operation method of claim 7, wherein the predetermined procedure comprises using an image detection control circuit to store a recorded image in a second memory of the second chip, and the step of accessing the event information by the first processor to perform processing accordingly further comprises:
    storing the recorded image in the second memory to the first memory by the first processor.

13. The dual-processor electronic apparatus operation method of claim 1, wherein the predetermined procedure comprises using a motion detection circuit to perform motion detection, performing component status monitoring or a combination thereof.

14. A dual-processor electronic apparatus, comprising:
a first processor configured to be activated in an initialization procedure; and
a second processor, wherein the first processor has a power dissipation larger than the second processor;
wherein after the first processor is activated in the initialization procedure, a second processor is activated by the first processor to enter an operation mode; the first processor is deactivated after the second processor enter the operation mode and the second processor executes a predetermined procedure; the second processor determines whether a predetermined event occurs during the execution of the predetermined procedure, and stores event information when the predetermined event occurs and activates the first processor such that the first processor accesses the event information to perform processing accordingly.

15. The dual-processor electronic apparatus of claim 14, wherein the first processor is deactivated after the first processor performs processing according to the event information, and the second processor keeps executing the predetermined procedure.

16. The dual-processor electronic apparatus of claim 14, wherein a first code corresponding to the first processor is loaded from an external memory to a first memory such that the first processor operates according to the first code in the first memory;
wherein the first code comprises a first partial code and a second partial code, the first partial code comprising commands to determine whether the second processor is to be activated and the second partial code comprising commands to activate an image detection control circuit; and
wherein the first processor executes the first partial code and activates the second processor before the second partial code is executed.

17. The dual-processor electronic apparatus of claim 16, wherein the second partial code comprises processing commands related to the event information.

18. The dual-processor electronic apparatus of claim 14, wherein the first processor controls a first circuit group and the second processor controls a second circuit group, and the first processor is configured to set an operation setting of the second circuit group in a register circuit.

19. The dual-processor electronic apparatus of claim 14, wherein the first processor controls a first circuit group and the second processor controls a second circuit group; and
wherein the first circuit group comprises a first image detection control circuit configured to control a high resolution image sensor and the second circuit group comprises a second image detection control circuit configured to control a low resolution image sensor.

20. The dual-processor electronic apparatus of claim 14, wherein the first processor controls a first circuit group and the second processor controls a second circuit group; and
wherein the first processor and the first circuit group are disposed in a first chip and the second processor and the second circuit group are disposed in a second chip.

* * * * *